US010417445B2

(12) United States Patent
Wouhaybi et al.

(10) Patent No.: US 10,417,445 B2
(45) Date of Patent: Sep. 17, 2019

(54) CONTEXT-AWARE PRIVACY METER

(71) Applicant: Intel Corporation, Santa Clara, CA (US)

(72) Inventors: Rita H. Wouhaybi, Portland, OR (US); Sridhar Mahankali, Beaverton, OR (US); Suhail Ahmed, Beaverton, OR (US); Brian Brougham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/359,690

(22) PCT Filed: Dec. 23, 2013

(86) PCT No.: PCT/US2013/077524
§ 371 (c)(1),
(2) Date: May 21, 2014

(87) PCT Pub. No.: WO2015/099664
PCT Pub. Date: Jul. 2, 2015

(65) Prior Publication Data
US 2015/0235050 A1 Aug. 20, 2015

(51) Int. Cl.
*G06F 21/62* (2013.01)
*H04W 64/00* (2009.01)
(Continued)

(52) U.S. Cl.
CPC ........ *G06F 21/6245* (2013.01); *G06F 16/955* (2019.01); *G06F 21/604* (2013.01);
(Continued)

(58) Field of Classification Search
CPC .......... G06F 21/6245; G06F 17/30876; H04W 4/02; H04W 4/04; H04W 4/025; H04W 64/00
See application file for complete search history.

(56) References Cited

U.S. PATENT DOCUMENTS

2012/0064920 A1* 3/2012 Shaw .................. H04W 4/02
455/456.4
2012/0222083 A1* 8/2012 Vaha-Sipila .......... H04L 63/102
726/1
(Continued)

FOREIGN PATENT DOCUMENTS

CN          103229201 A   7/2013
KR   10-2010-0053706 A   5/2010
KR   10-2013-0082518 A   7/2013

OTHER PUBLICATIONS

Sarah Perez. "Placed Insights Debuts, Bringing ComScore-Like Analytics & Ratings to the Physical World" article published May 1, 2013 (8 pages) http://techcrunch.com/2013/05/01/placed-insights-debuts-bringing-comscore-like-analytics-ratings-to-the-physical-world/.*

(Continued)

*Primary Examiner* — Joseph P Hirl
*Assistant Examiner* — Thomas A Gyorfi
(74) *Attorney, Agent, or Firm* — Schwabe, Williamson & Wyatt, P.C.

(57) ABSTRACT

Technologies are presented that provide context-aware privacy metering regarding establishments, such as consumer establishments. A method of rating privacy of one or more establishments may include receiving a location designation of a user device from the user device (automatically or via user input), obtaining privacy-related information regarding one or more establishments in proximity of the location designation, and generating one or more privacy score vector algorithms for the one or more establishments based on the privacy-related information regarding the one or more establishments. The method may further include obtaining a privacy profile of the user, determining one or more privacy scores for the one or more establishments by applying the privacy profile of the user to the one or more privacy score (Continued)

vector algorithms. The method may further include generating and providing a privacy-related recommendation regarding a particular establishment.

25 Claims, 9 Drawing Sheets

(51) Int. Cl.
  *G06F 17/30* (2006.01)
  *H04W 4/02* (2018.01)
  *G06F 16/955* (2019.01)
  *G06F 21/60* (2013.01)

(52) U.S. Cl.
  CPC .............. *H04W 4/02* (2013.01); *H04W 64/00* (2013.01); *G06F 2221/2111* (2013.01); *G06F 2221/2135* (2013.01)

(56) References Cited

U.S. PATENT DOCUMENTS

| | | | | |
|---|---|---|---|---|
| 2013/0298247 | A1* | 11/2013 | Laurila | G06F 21/6245 726/26 |
| 2013/0325856 | A1* | 12/2013 | Soto Matamala | G06F 17/3087 707/724 |
| 2013/0340086 | A1* | 12/2013 | Blom | G06F 21/6245 726/26 |
| 2014/0059695 | A1* | 2/2014 | Parecki | G06F 21/60 726/26 |
| 2014/0096261 | A1* | 4/2014 | Boldyrev | G06F 21/00 726/26 |
| 2014/0298347 | A1* | 10/2014 | Aylesworth | G06Q 10/0631 718/104 |
| 2015/0088616 | A1* | 3/2015 | McQuay | G06Q 10/06395 705/7.41 |

OTHER PUBLICATIONS

Malhotra et al., "Internet Users' Information Privacy Concerns (IUIPC): The Construct, the Scale, and a Causal Model", Information Systems Research, vol. 15, No. 4, Dec. 2004, pp. 336-355.
International Search Report and Written Opinion received for PCT Patent Application No. PCT/US2013/077524, dated Sep. 19, 2014, 11 pages.
Office Action dated Feb. 2, 2018 for Chinese Patent Application No. 201380081123.6, 30 pages.
Office Action dated Oct. 24, 2018 for Chinese Patent Application No. 201380081123.6, 8 pages.
Office Action dated Mar. 27, 2019 for Chinese Patent Application No. 201380081123.6, 11 pages.

* cited by examiner

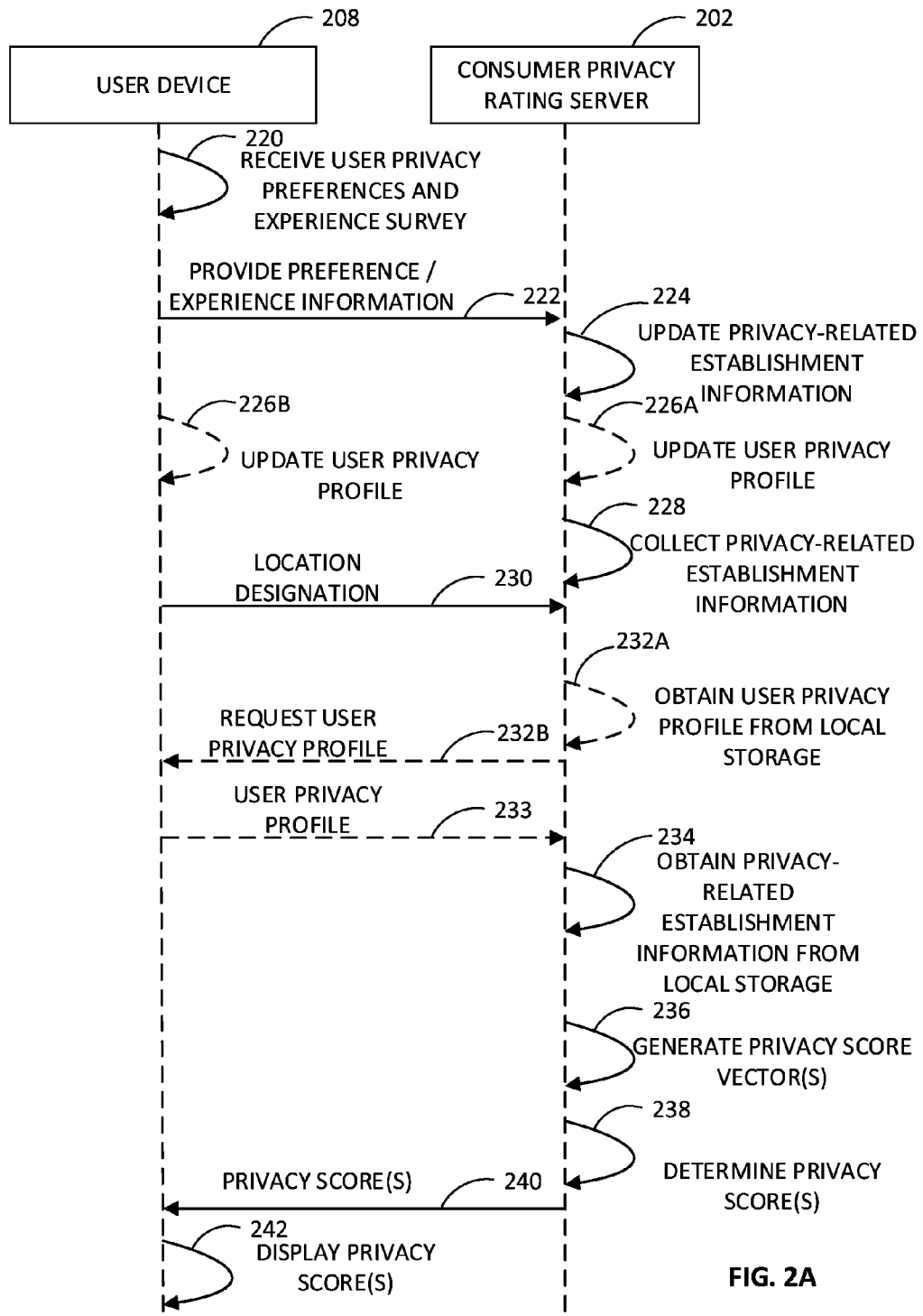

CONTEXT-AWARE PRIVACY METER

BACKGROUND

Many business establishments that consumers patronize, such as retail stores, restaurants, etc., try to monitor their customers and their behavior. Many offer loyalty-based membership cards and/or credit cards offering consumers discounts and special offers. However, these "memberships" are often used to track and profile customers, by monitoring store visits, purchases made, etc. Consumers are usually required to register for these memberships using personal information, and the personal information in conjunction with the subsequently collected consumer behavioral data may allow the establishments to study trends within certain demographics and markets, which may assist them in improving their products and/or services. What else the businesses do with this data is often a subject of debate, however. Many advocacy groups and consumers themselves may want to know what data is captured, how the data is used, whether it is sold or otherwise provided to others, whether and when it is purged, etc. In addition to, or instead of, loyalty memberships, establishments may monitor consumer behavior using other means, such as in-store security cameras, demographic profiling, etc.

Many advocacy groups may attempt to keep track of privacy-related behavior and practices of various establishments. However, these groups may tend to be very conservative and strict in their privacy ratings. The advocacy groups may require a consumer to proactively, and frequently, visit their websites to stay updated on their studied establishments. Furthermore, there likely may not be a way for one or more consumers to provide feedback in a way that influences the advocacy groups' opinions of establishments.

For average consumers, it is currently difficult to determine what establishments are capturing what information about them and the privacy-related risks associated with each establishment. Moreover, the concept of privacy has become very fluid and elastic where it may be perceived and accepted differently by different people. For some, privacy is of utmost concern, driving some to paranoia levels, while others are not concerned about it at all. It is expected, however, that most consumers are uncomfortable with their personal data being taken and used, especially if they may be unaware if or when it is even being done.

BRIEF DESCRIPTION OF THE DRAWINGS/FIGURES

FIGS. 2A-2C illustrate a sequence diagram of an example process flow as described herein, according to an embodiment.

Figure 1:
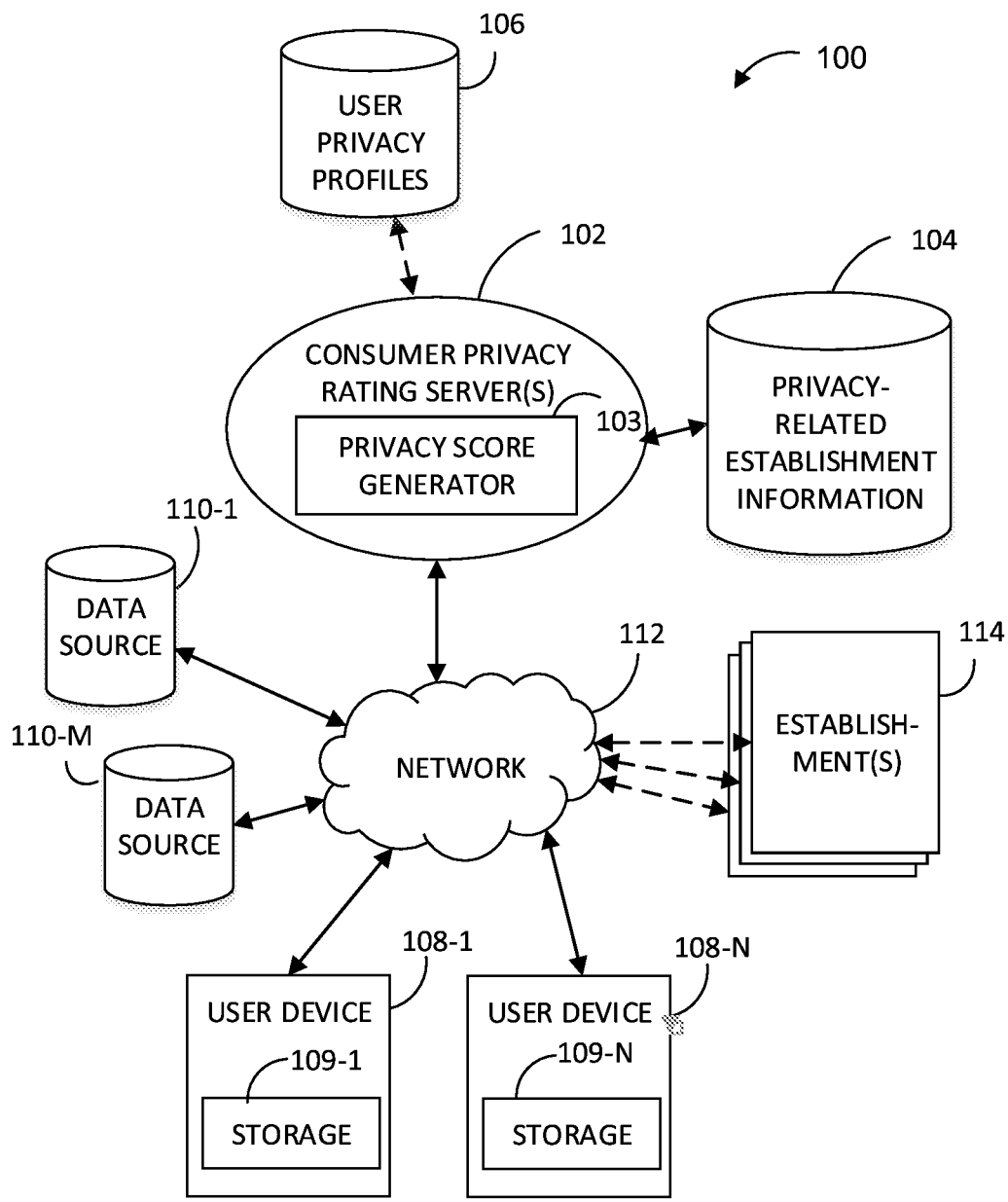
FIG. 1 is a block diagram of an example system described herein, according to an embodiment.

In the drawings, the leftmost digit(s) of a reference number may identify the drawing in which the reference number first appears.

DETAILED DESCRIPTION

When a consumer is about to "visit" an establishment, the consumer may want to know ahead of time what privacy risks would be taken by doing so. By "visiting", a consumer may, for example, be about to physically walk into a business establishment (such as, for example a retail store or a restaurant), be planning on visiting an establishment at a later time, or have just accessed a website, or web-based or downloaded application of, an establishment. The privacy risks that a consumer may be interested in may pertain to, for example, what personal data may be collected by the establishment and/or how personal data is used by the establishment, whether and/or where there are cameras in the establishment and how they are used, etc. Currently, there are no services that provide this information to a consumer in a direct and timely manner.

Disclosed herein are technologies that solve the technical problem of how to provide a consumer with metrics, ratings, and/or recommendations regarding privacy for the establishments that consumer would like to visit, either physically or virtually, and either prior to arriving or just as they are arriving at those establishments. The technologies disclosed herein determine privacy metrics that use publicly available information and crowd-sourced data in conjunction with the user's own context and previous behavior. The privacy metrics may be used to provide ratings and/or recommendations to the user with regard to what action to take at the establishments the user would like to patronize based on the user's own comfort level with regard to privacy.

Embodiments are now described with reference to the figures, where like reference numbers may indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

FIG. 1 is a block diagram of an example system 100, according to an embodiment. System 100 may include a consumer privacy rating server 102, of a consumer privacy rating service, which may include, or have access to, a data store 104 of privacy-related establishment information, and optionally, a data store of user privacy profiles. System 100 may also include one or more data sources 110-1 to 110-M (collectively, 110), which may include various types of privacy-related information with regard to various establishments visited by consumers, such as business establishments and/or websites, retail stores and/or websites, restaurants, etc. System 100 may also include one or more user devices 108-1 to 108-N (collectively, 108) of users of the consumer privacy rating service (e.g., consumer users who visit the various establishments that are rated by this service). The consumer privacy rating server 102, the data sources 110, and the user devices 108 may be in communication via a network 112.

The consumer privacy rating server 102 may include a privacy score generator 103 that may be implemented in software and/or hardware executed or controlled by a controller of the consumer privacy rating server 102. While only one consumer privacy rating server is illustrated for clarity and ease of discussion, it should be appreciated that the consumer privacy rating server may include multiple distributed server computers for redundancy and/or load sharing, for example.

The user devices 108 may be computing devices that may include mobile and non-mobile devices. Mobile devices may include, but are not to be limited to, for example, laptop computers, ultra-laptop computers, tablets, touch pads, portable computers, handheld computers, palmtop computers, personal digital assistants (PDAs), e-readers, cellular telephones, combination cellular telephone/PDAs, mobile smart devices (e.g., smart phones, smart tablets, etc.), mobile internet devices (MIDs), mobile messaging devices, mobile data communication devices, mobile media playing devices, cameras, mobile gaming consoles, etc. Non-mobile devices may include, but are not to be limited to, for example, personal computers (PCs), televisions, smart televisions, data communication devices, media playing devices, gaming consoles, etc. The user devices 108 are user devices (e.g., personal user devices of consumers) that may include controllers and other components that execute software and/or control hardware in order to execute local programs or consume services provided by external service providers over a network. For example, the user devices 108 may include one or more software clients or applications for utilizing or accessing web-based services (e.g., online stores or services, social networking services, etc.). The user devices 108 may also, or instead, include a web interface running in a browser from which the user device can access such web-based services. User devices 108 may also include storage devices 109-1 to 109-N (collectively 109) to store logic and data associated with the programs and services used by the users of the user devices.

The network 112 may be any wired or wireless network, such as a Wide Area Network (WAN), a Local Area Network (LAN), and/or the like. As an example, the network 112 may be a distributed public network, such as the Internet, where the consumer privacy rating server 102 and the user devices 108 are connected to the network 112 via wired or wireless connections.

System 100 may optionally also include a communication link from the establishments 114 themselves to the consumer privacy rating server 102. As an example, an establishment may be particularly proud of its rating by the consumer privacy rating service, and may wish to have direct access to their rating on display at a kiosk in the store. At such a kiosk, a user may also be able to access the user's account in order to view a privacy rating for the establishment customized to that user's preferences, etc.

In embodiments described more fully below, the consumer privacy rating service may determine privacy score vector algorithms for a particular establishment based on privacy-related information it has collected for that establishment and stored in data store 104. The privacy-related establishment information may be collected by the consumer privacy rating server 102 in various ways. For example, data agents may be regularly or occasionally spawned by consumer privacy rating server 102 to crawl the World Wide Web, via network 112, for privacy-related establishment information from data sources 110. Data sources 110 may include, but are not to be limited to, websites and other data sources of, for example, advocacy groups, watchdogs, privacy-related blogs, news services, or establishments themselves. The data collected from the data sources may include, but are not to be limited to, for example, electronically accessible privacy statements of establishments, pledges to consumers by establishments, data policies of the establishments, warnings regarding establishments, news stories regarding establishments, etc.

Privacy-related establishment information may also be received by the consumer privacy rating server 102 from users of the consumer privacy rating service. For example, users may be provided with the capability to submit various types of information regarding establishments including, but not to be limited to, for example, photographs, videos, positive feedback, negative feedback, general comments, etc. A user may want to provide this information because the user witnessed something during the user's experience with the establishment that it believes should be reported to the consumer privacy rating service. In an embodiment, the consumer privacy rating server 102 may also automatically collect information regarding actual behavior of users with regard to the establishments that they have visited. For example, the consumer privacy rating server 102 may automatically detect that a user never visits a particular establishment with the user's children, which may indicate that the user may not be comfortable bringing children to that establishment for privacy-related reasons. In another example, the consumer privacy rating server 102 may automatically detect that a user regularly uses an establishment loyalty card or credit card, which may indicate that the user is fairly comfortable with that establishment with regard to privacy. In another example embodiment, the consumer privacy rating server 102 may monitor audio, and may determine whether a user shared personal information (e.g., a zip code, and email address, a phone number, etc.) In yet another example embodiment, the consumer privacy rating server 102 may monitor electronic communications (e.g., email) of the user. In such an embodiment, the consumer privacy rating server 102 may determine that the user does not receive any emails from a particular establishment, which may indicate that the user did not share that type of information with the establishment. These types of determinations are pertinent to a particular user, but may also be used by the consumer privacy rating server 102 to establish collective data regarding establishments that would benefit other users when determining privacy score vector algorithms for those establishments for those other users.

A consumer may become a user of the consumer privacy rating service by registering for the service through, for example, client software that is downloaded and run on a user device 108 or a web-based client running in a browser on a user device 108. When a user registers, aside from possibly having a user provide identification and contact information, a user may be asked to answer some privacy-related questions in order to establish an initial user privacy profile and comfort level. The questions may relate to, for example, user preferences regarding privacy, information regarding the user's experience with various establishments or other establishments like the various establishments, etc. The user-provided preferences may include, for example, the user's comfort level with cameras or other surveillance devices used at establishments; the user's comfort level with one or more of facial analysis, gender recognition, gender profiling, age recognition, age profiling, or dress profiling; the user's comfort level with providing to establishments one or more of the user's name, the user's birthdate, the user's phone number, the user's email address, the user's zip code, the user's gender, the names of the user's children, or the ages of the user's children; the user's comfort level with allowing establishments to keep track of the user's transactions and for how long; etc. The user-provided experience information may include, for example, the types of establishments the user frequents, the types of transactions the user conducts at those establishments, information regarding the user's privacy-related experiences at various establishments, etc. Further questions may also be asked depending on the user's answers to previous questions. In an alternative embodiment, a user may choose not have a user privacy profile created.

In embodiments, the user privacy profile may be edited by the user and/or may be automatically updated based on automatically collected information regarding the user's actual behavior in an establishment. For example, the consumer privacy rating service may create a user privacy profile for a user based on the user's preference and/or experience input at the time of user registration. The user may view the user's profile and think the profile has characterized the user as slightly more concerned about privacy than the user really is. The user may be able to adjust the settings of the user privacy profile to more accurately represent the user's positions regarding privacy. This profile adjustment may be done in various ways, such as by adjusting sliders, numerical settings, high/medium/low settings, mapping settings to those of another user, etc. These types of profile adjustments would be understood by those skilled in the art and are not discussed further here.

The automatic collection of information regarding the user's actual behavior in an establishment may also be used to update the user's privacy profile. For example, if a user's privacy profile indicates that the user wants to avoid establishments that use cameras to profile people, but the consumer privacy rating service determines automatically that a user shopped in a retail store, for example, despite a warning not to enter the store due to the usage of cameras, the consumer privacy rating service may adjust the user's profile setting to one that is more tolerant of camera usage and/or of that particular store.

Usage of the consumer privacy rating service system will now be discussed. Examples used to discuss the system's usage may involve references to a user entering a retail store for ease of description and understanding. However, usage of the system is not to be limited to user interaction with retail stores. Many other types of establishments and interactions therewith, including visits to virtual establishments (websites of establishments, etc.), may also be contemplated within the scope of this disclosure.

Figure 2B:
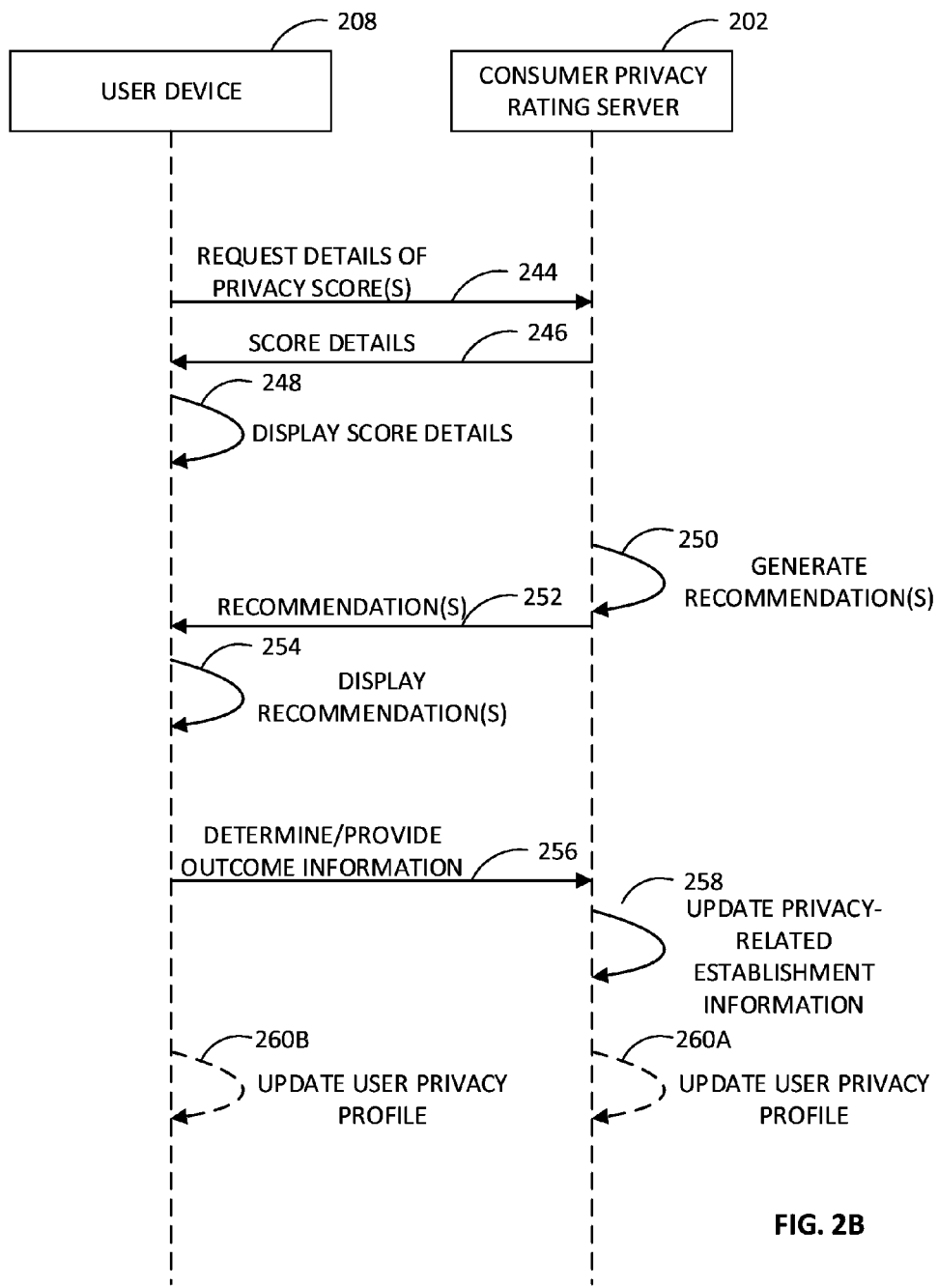
Figure 2C:
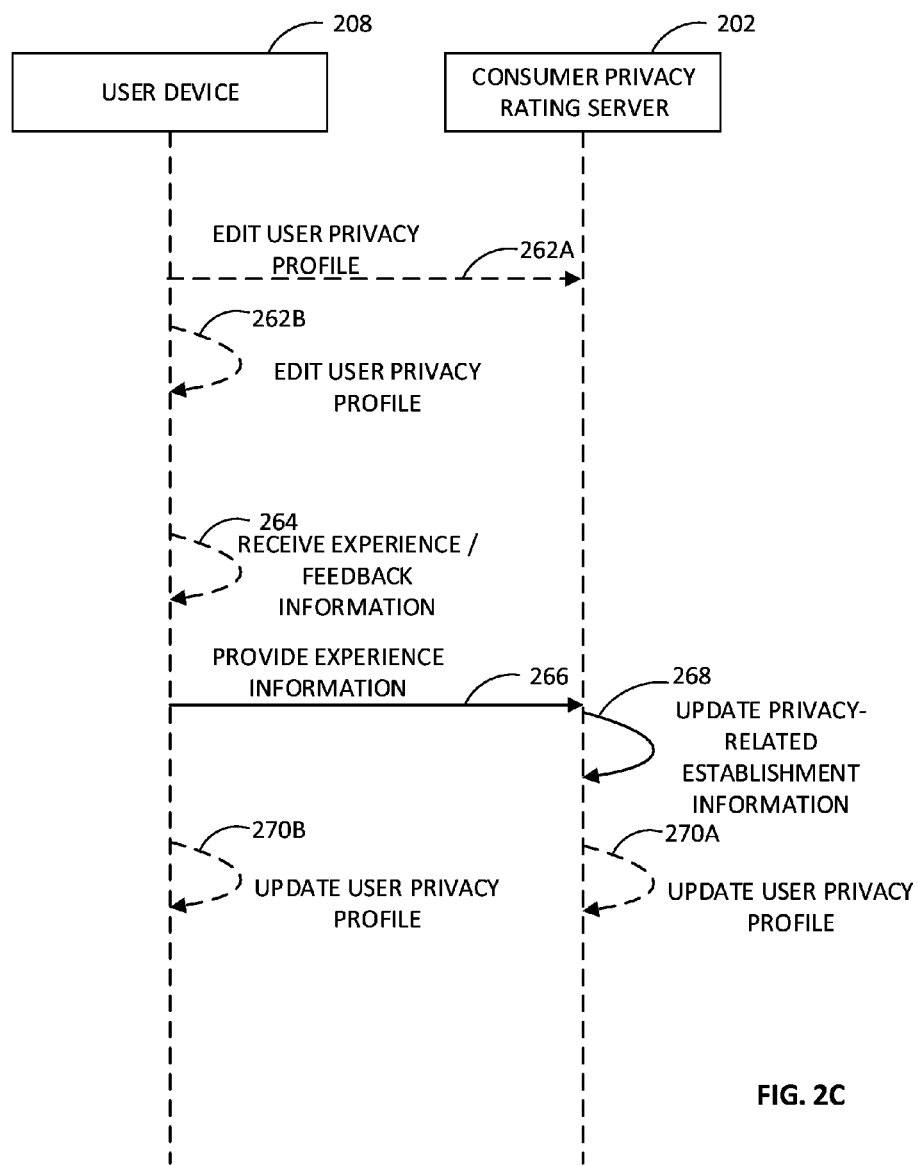

FIGS. 2A-2C illustrate a sequence diagram of an example process flow of the consumer privacy rating service, according to embodiments. In these embodiments, the consumer privacy rating server determines both a privacy score vector algorithm and, subsequently, a privacy score or rating for one or more establishments. In other embodiments (e.g., discussed below with regard to FIGS. 3A-3C), the consumer privacy rating server may determine privacy score vector algorithms, with the privacy scores for establishments determined at the user device.

In FIG. 2A, user device 208 may receive user privacy preferences and/or experience information (220) from the user, via, for example, a user interface of the user device. The user privacy preferences and experience information may be provided by the user when the user registers for the consumer privacy rating service, or alternatively, if this information is already established, the user may update the user privacy preferences and experience information via a user interface of user device 208 running a consumer privacy rating service client application. The user privacy preferences and experience information may be provided to the consumer privacy rating server 202 (222). The consumer privacy rating server 202 may update privacy-related establishment information (224) that may be collected and maintained by the consumer privacy rating server 202, based on the received user privacy preferences and/or experience information. In an embodiment, a user profile of the user may be maintained by the consumer privacy rating server 202, in which case the user privacy profile may be updated by the consumer privacy rating server 202 based on the received user privacy preferences and/or experience information (226A). In an alternate embodiment, the user device 208 may maintain the user privacy profile for the user, in which case user device 208 may update the user privacy profile for the user based on the user privacy preferences and/or experience information (226B). In yet another embodiment, both the consumer privacy rating server 202 and the user device 208 may maintain, or may occasionally synchronize, copies of the user privacy profile of the user. In a still further embodiment, a user may choose not to create a user privacy profile.

Consumer privacy rating server 202 may collect privacy-related establishment information (228), as discussed above. In embodiments, this collection of privacy-related establishment information may occur at designated scheduled times, regularly (e.g., every night from midnight to 3 am), occasionally (whenever there are no user requests pending), etc. These examples are not meant to be limiting.

Various user scenarios will now be discussed. As an example, a user may be out shopping and may be about to enter a retail store. The user may initiate the consumer privacy rating service client application on the user's mobile device (e.g., user device 208), or alternatively may already have the client application running on the user device. The user device 208 may send a location designation to the consumer privacy rating server 202 (230). The location designation may be, for example, global positioning system (GPS) coordinates of the location of the user device 208, or other location coordinates or designations of the location of the user device 208 (e.g., a "last known" location, location information obtained by pinging nearby mobile devices or through a Wi-Fi access point, etc.). The consumer privacy rating server 202 may determine, based on the location designation, which establishment or establishments the user may be near. For example, the consumer privacy rating server 202 may determine the closest establishment to the user, or may determine that the user is within a given distance from a number of establishments. As will be discussed in more detail below, the user may then be provided with ratings and/or recommendations regarding privacy for any or all of those nearby establishments.

As another example, a user may be planning a shopping trip for later in the day, in which case the user may enter, using the consumer privacy rating client application or on a webpage of the consumer privacy rating service that the user has logged into, for example, a location designation to be provided to the consumer privacy rating server 202, such as, for example, one or more zip codes of the area in which the user plans to shop. In embodiments, other types of location designations may also be entered, such as for example, allowing the user to circle an area on a map, naming a city, or naming one or more establishments of a specific location. The consumer privacy rating server 202 may determine, based on the location designation, which establishment or establishments are within the area designated by the user. The user may then be provided with ratings and/or recommendations regarding privacy for any or all of those establishments. In an embodiment, the ratings and/or recommendations may be for individual establishments (e.g., individual stores). In another embodiment, ratings may be provided on a heat map, where individual establishment ratings may be shown and/or a collective rating for a particular area, which may be useful in rating a shopping center or mall, for example.

In yet another example, the location designation provided to the consumer privacy rating server 202 may be a virtual location designation. In this example, the user may visit a website of an establishment, such as a retail store or chain. If the consumer privacy rating service client application is running on the user device, it may automatically detect that the user is visiting a website of an establishment for which privacy ratings and/or recommendations may be provided. The user may then be provided with ratings and/or recommendations regarding privacy for that particular establishment.

In the above descriptions are examples of being near or "in proximity" of one or more establishments. Being "in proximity" may have various definitions. For example, to be "in proximity" of an establishment, the location represented by a location designation may be, but is not to be limited to, within a given distance of known coordinates of the establishment, inside the establishment, at a website of the establishment, within a user-entered zip code that includes the establishment, etc.

Prior to determining privacy score(s) and/or recommendation(s), the consumer privacy rating server 202 may obtain the user's privacy profile in order to customize the privacy score(s) and/or recommendation(s) for the user. In an embodiment, if the consumer privacy rating server 202 maintains user privacy profiles, then the consumer privacy rating server 202 may obtain the user privacy profile from its local storage (232A). In another embodiment, if the user device 208 maintains the user privacy profile, then the consumer privacy rating server 202 may request the user privacy profile from user device 208 (232B), and receive the user privacy profile from user device 208 (233). In an embodiment, generic privacy rating(s) and/or recommendation(s) regarding establishments, without taking a user's privacy profile into consideration, may be provided by the system (e.g., if the user chooses not to establish a user privacy profile); however, generic privacy rating(s) and/or recommendation(s) may not be as useful to a user as customized privacy rating(s) and/or recommendation(s).

The consumer privacy rating server 202 may obtain privacy-related establishment information from its local storage based on the received location designation (234). The privacy-related establishment information may relate to particular establishments that fit the received designation information (e.g., establishments within a certain distance of the location designation, establishments within one or more zip codes provided by the user, the establishment associated with the website that the user is visiting, etc.).

The consumer privacy rating server 202 may generate one or more privacy score vector algorithms based on the obtained privacy-related establishment information (236). A privacy score vector algorithm may provide an algorithm from which a privacy score and one or more recommendations may be generated with regard to a particular establishment. As there are countless algorithms that may be used for this purpose, as would be understood by those of skill in the art, specific vector algorithms will not be discussed here. A privacy score vector algorithm may incorporate many various types of information regarding an establishment, such as, but not to be limited to, for example, extent of camera usage, extent of profiling using demographics (e.g., gender, age, etc.), extent of profiling using a loyalty program or store card (e.g., store credit card), extent of selling or sharing of anonymized or non-anonymized data with other business entities (e.g., business partners), extent of selling or sharing of data to other parties, etc.

The consumer privacy rating server 202 may determine one or more privacy score(s) regarding the relevant establishment(s) using the one or more privacy score vector algorithms (238). If a user privacy profile exists for the user, the consumer privacy rating server 202 may apply the user privacy profile to the privacy score vector algorithm(s) to determine one or more customized privacy scores for the user regarding the relevant establishments. In an embodiment, where customization using a user privacy profile is not done (e.g., if a user profile for a user does not exist, if the user opts to not set up a user profile, etc.), a generic or default privacy profile may be applied to the privacy score vector algorithm(s) to determine privacy score(s). A default privacy profile may be, for example, a profile created using profiles of other users who may be considered similar to the user. In a still further embodiment, the privacy score vector algorithm(s) may be used to determine privacy score(s) without applying any profile.

In an embodiment, a user privacy profile may be set by proxy where an entity sets a policy that will be adopted on one or more devices. In an example, a company set may set privacy requirements and logging capabilities on mobile devices that it offers its employees for business use. In another example, a parent may set up a user privacy profile on a mobile device for a minor (e.g., a teenager).

The determined privacy score(s) may be provided to the user device 208 by the consumer privacy rating server 202 (240). User device 208 may display the privacy score(s) to the user via a user interface on the user device 208 (242) (e.g., via a pop-up display, a text message, an email, a window of the consumer privacy rating service application running on user device 208, a webpage of the consumer privacy rating service, etc.). A privacy score may be, but is not to be limited to, for example, a numerical rating (e.g., 1-5), a grade (e.g., A, B, C, D, F, or 0%-100%), an indication of high/medium/low, an object rating (e.g., coloration of five stars), etc.

The discussion of the consumer privacy rating service continues with reference to FIG. 2B. Upon viewing the one or more privacy score(s), a user may want to know what information was behind a particular privacy score, and may request such information from the consumer privacy server 202 (244). For example, a user may click on the displayed rating or a request button, for example, on the user interface to "drill down" to see what information about a particular establishment the score represented. The consumer privacy rating server 202 may receive the request for details behind a privacy score and provide the requested privacy score details to user device 208 (246). User device 208 may receive and display the privacy score details (248).

In addition to, or instead of, generating one or more privacy scores, the consumer privacy rating server 202 may generate privacy-related recommendations for the user with regard to the relevant establishments (250) based on the privacy-related establishment information for the relevant establishment, and if a user privacy profile exists, the user privacy profile of the user. In embodiments, the generated recommendation(s) may be based on the privacy score vector algorithm, either alone or in conjunction with the user's privacy profile. In embodiments, known recommendation algorithms, such as collaborative filtering, may be used across the user population, for example, to generate the recommendation(s). The generated recommendation(s) may be provided to user device 208 (252). In embodiments, the recommendation(s) may be provided along with, or instead of, the determined privacy score(s). In other embodiments, the recommendation(s) may be provided at the request of the user, prior to, in conjunction with, after, or instead of, the user device 208 being provided the privacy score(s). User device 208 may display the recommendation(s) (254). A recommendation may include warning(s) or other types of information regarding a particular establishment to help a user decide whether and/or how to visit that establishment within their own comfort level. For example, a recommendation may recommend that the user enter the establishment with caution because cameras are used in certain areas of the establishment and that data regarding the user will be tracked if the establishment loyalty card is used. In another example, if the recommendation is customized based on the user's privacy profile, and the user's thresholds for cameras and data usage are very low, the recommendation for that user may be to not enter the store at all.

Some time after the user is provided with the privacy rating(s) and/or recommendation(s) (e.g., within a given time period, such as one or more hours or days), the user may act in response to the privacy rating(s). For example, a user may follow a provided recommendation to not enter an establishment. As another example, a user may enter an establishment and use a loyalty card after being warned about the establishment's use of cameras and collected data regarding the user. Based on, for example, location data (e.g., global positing system (GPS) location data), loyalty card usage data, etc., that may be provided by user device 208 (either automatically or through direct user input, for example) to consumer privacy rating server 202 (256), consumer privacy rating server 202 may update the privacy-related establishment information for the relevant establishments (258). In an embodiment, if the consumer privacy rating server 202 maintains user privacy profiles, the consumer privacy rating server 202 may update the user privacy profile (260A). In an embodiment, if user device 208 maintains the user privacy profile for the user, user device 208 may update the user privacy profile (260B). The user privacy profile for the user may be updated, or adjusted, based on the user's actual behavior with regard to the establishment, if the thresholds set in the user privacy profile are too high or too low. For example, if the system recommended that the user not enter an establishment due to camera use, but the user enters the establishment despite the recommendation, the user's threshold for camera usage in the user privacy profile may automatically be adjusted. A threshold may also change after several instances of a user not following a recommendation in order to account for outliers. In addition, a rating of the store may also be influenced by this in order to reflect that consumers seem to be comfortable with a particular establishment despite privacy concerns. In an embodiment, the consumer privacy rating service may show multiple ratings (e.g., one based on mined and reported data, and another based on shoppers' behavior).

The discussion of the consumer privacy rating service continues with reference to FIG. 2C. As stated earlier, in embodiments, the user privacy profile may be edited by the user via the user interface of user device 208. In an embodiment, if user privacy profiles are maintained by the consumer privacy rating server 202, the user device 208 may allow the user to edit the user's user privacy profile and may provide the updates to consumer privacy rating server 202 (262A). In an embodiment, if a user privacy profile is maintained by the user device 208, the user device 208 may allow the user to edit the user privacy profile to be saved locally at user device 208 (262B).

On occasion, the user may wish to provide the consumer privacy rating service with feedback regarding the user's experience with a particular establishment. In an embodiment, user device 208 may allow the user to enter, through the user interface of user device 208, feedback regarding the user's experience at a particular establishment (264), and user device 208 may provide the feedback to consumer privacy rating server 202 (266). Consumer privacy rating server 202 may update the privacy-related establishment information for that particular establishment based on the provided feedback (268). In an embodiment, if user privacy profiles are maintained by the consumer privacy rating server 202, the consumer privacy rating server 202 may update the user privacy profile of the user based on the provided feedback (270A). In an embodiment, if a user privacy profile is maintained by the user device 208, the user device 208 may update the user privacy profile of the user based on the provided feedback (270B). In an embodiment where both the consumer privacy rating server 202 and the user device 208 maintain the user privacy profile, both may update the user privacy profile of the user based on the provided feedback. The feedback provided by the user may include various types of information regarding a particular establishment including, but not to be limited to, for example, photographs, videos, positive feedback, negative feedback, general comments, etc. The consumer privacy rating server 202 may be able to categorize that feedback for subsequent use in generating privacy vector algorithms and/or privacy-related recommendations.

Figure 3A:
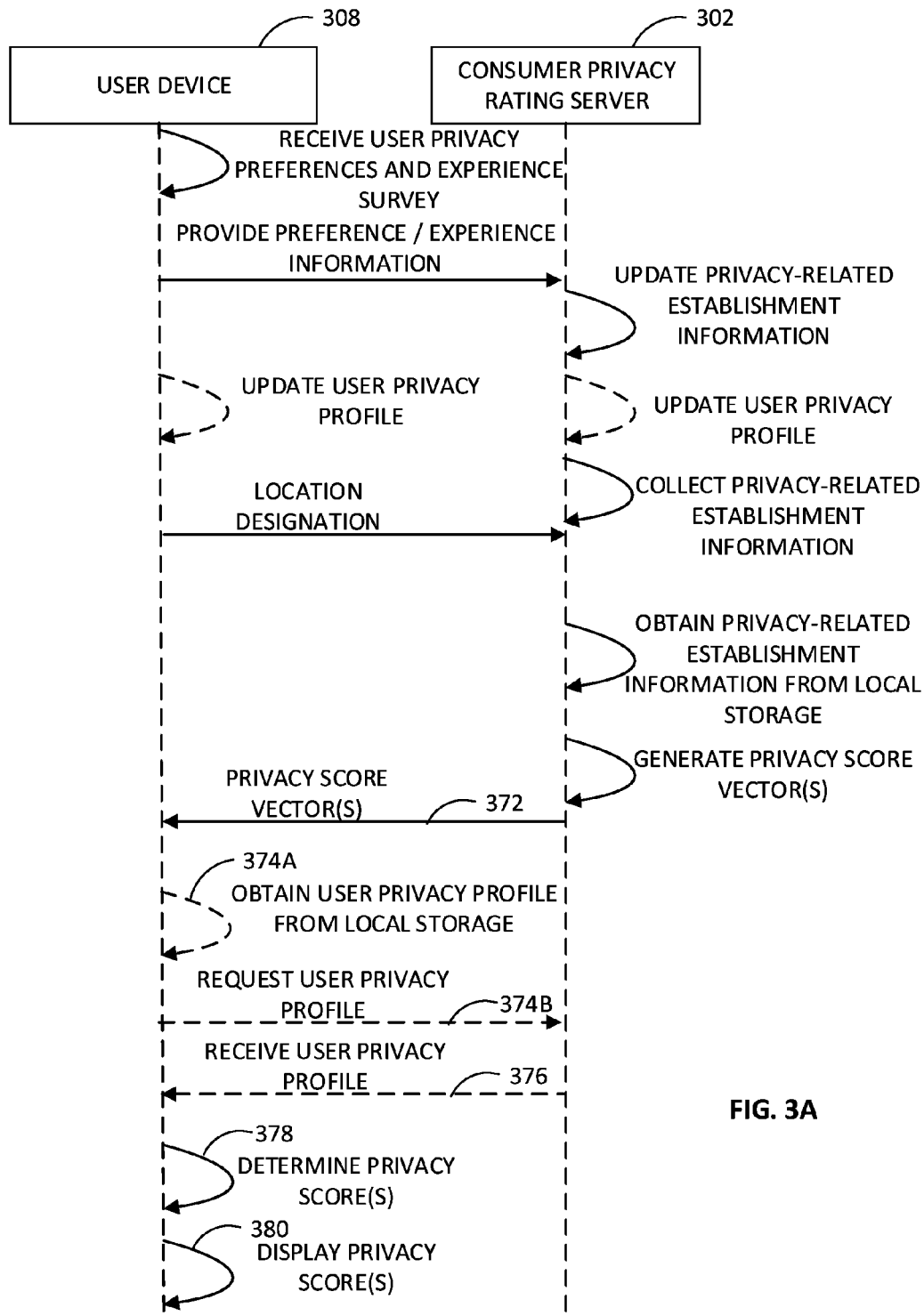
FIGS. 3A-3C illustrate a sequence diagram of an example process flow as described herein, according to an embodiment.
Figure 3B:
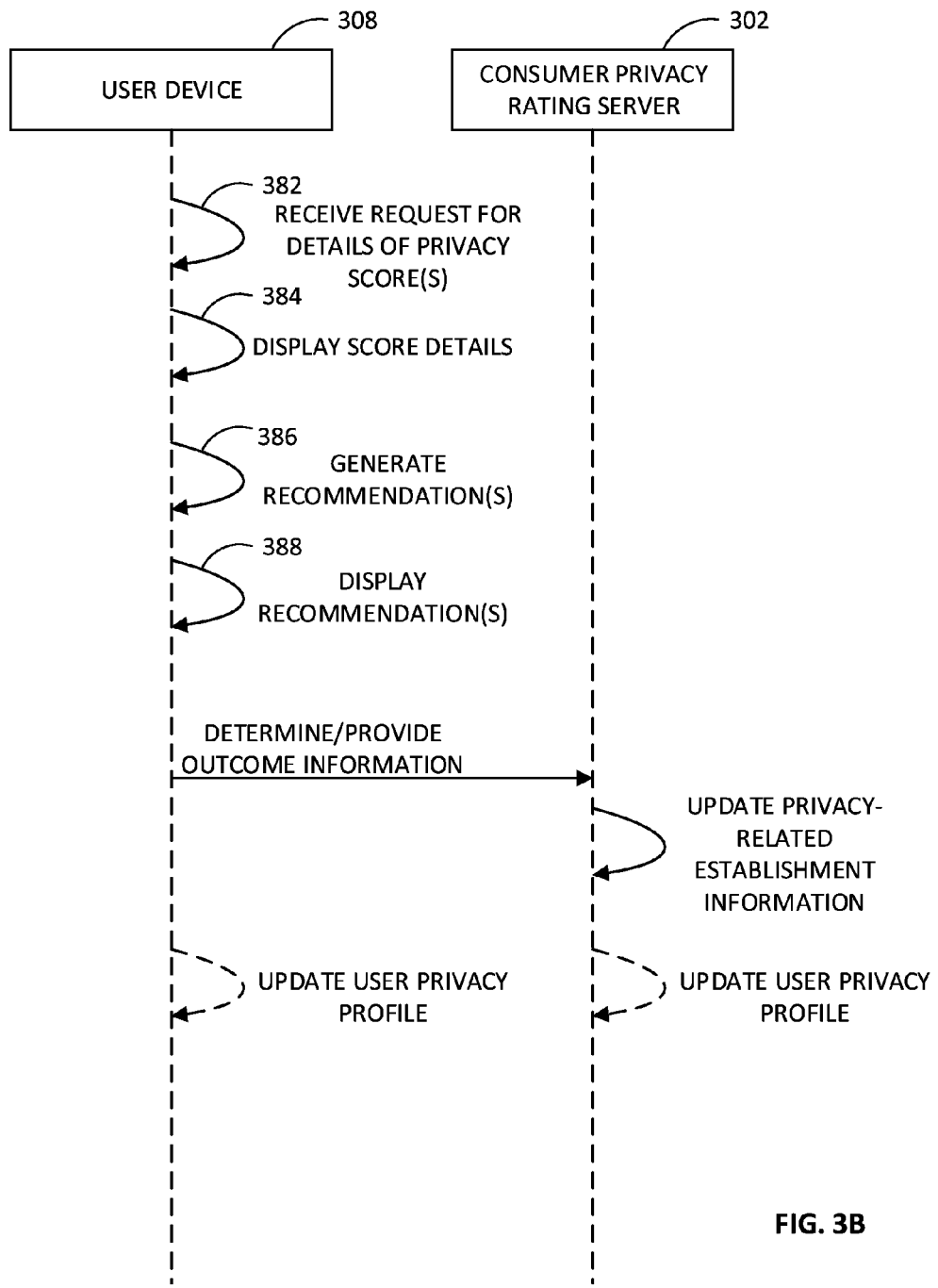
Figure 3C:
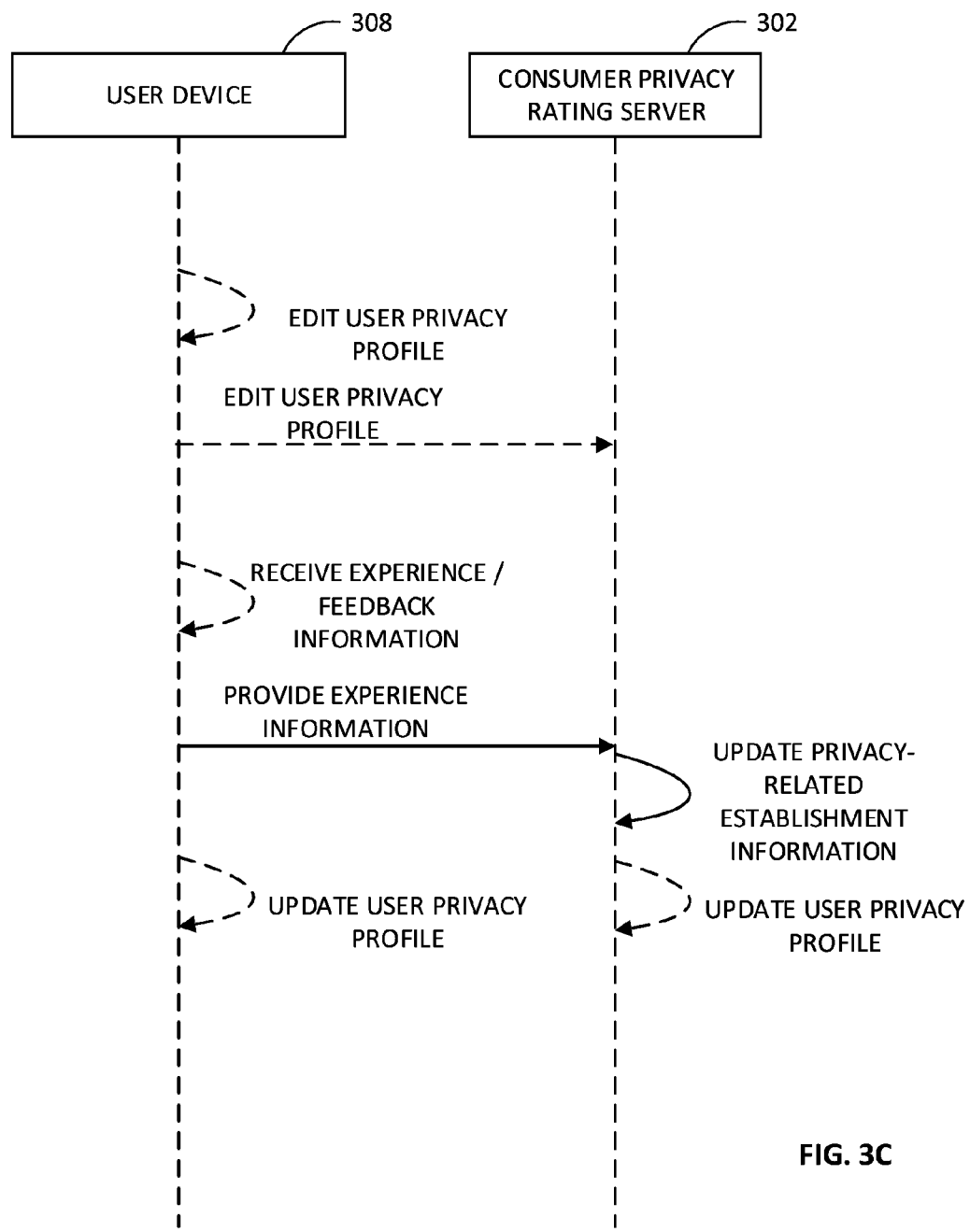

FIGS. 3A-3C illustrate a sequence diagram of an example process flow of the consumer privacy rating service, according to embodiments. These embodiments are similar to the embodiments shown with regard to FIGS. 2A-2C, except that the consumer privacy rating server provides the generated privacy score vector algorithm(s) to the user device 208 to determine the establishment privacy rating(s) and/or recommendation(s).

In FIG. 3A, similar to embodiments described with reference to FIG. 2A, a location designation may be provided by user device 308 to the consumer privacy rating server 302, and consumer privacy rating server 302 may obtain the relevant privacy-related establishment information from local storage and generate one or more privacy score vector algorithm(s) for the relevant establishments. Here, however, the generated privacy score vector algorithm(s) are provided by the consumer privacy rating server 302 to user device 308 (372). User device 308 may obtain the user privacy profile for the user, if one exists, in order to apply the user privacy profile to the received privacy score vector algorithm(s). In an embodiment where user device 308 maintains the user privacy profile, the user device 308 may obtain the user privacy profile from local storage (374A). In an embodiment where user privacy profiles are maintained by the consumer privacy rating server 302, user device 308 may request the user privacy profile from consumer privacy rating server 302 (374B) and receive the user privacy profile from consumer privacy rating server 302 (376). User device 308 may determine a privacy score for each relevant establishment (378) by applying the user privacy profile to the received privacy score vector algorithm(s). User device 308 may then display the determined privacy score(s) (380).

The discussion of the consumer privacy rating service continues with reference to FIG. 3B. In an embodiment, user device 308 may receive a request for details regarding a particular privacy score (382) from the user. For example, upon viewing a displayed privacy score of a particular establishment, the user may wish to "drill down" to see what information that privacy score represented. The user may, for example, using the user interface of user device 308, click on the rating or a designated button to request further details regarding a particular privacy score. User device 308 may fetch and display the requested score details (384).

In embodiments, user device 308 may generate one or more privacy-related recommendations for the user with regard to the relevant establishments (386) based on the received privacy score vector algorithm, either alone or in conjunction with the user's privacy profile, and display the recommendation(s) (388). In embodiments, the recommendation(s) may be displayed along with, or instead of, the determined privacy score(s). In other embodiments, the recommendation(s) may be provided at the request of the user. The recommendation(s) may be provide, prior to, in conjunction with, after, or instead of the privacy score(s). As described earlier, a recommendation may include warning(s) or other types of information regarding a particular establishment to help a user decide whether and/or how to visit that establishment within their own comfort level.

Other features illustrated in FIGS. 3A-3C are similar to the features described above with reference to FIGS. 2A-2C and will not be described again here.

There are many additional useful features that may be incorporated into a consumer privacy rating service such as the service described herein. For example, in an embodiment, a user may be able to specify that the user wishes his or her user privacy profile to mirror that of a "friend" who is also a user of the service. The "friend" may be able to be identified as having an established relationship with the user in various ways. The "friend" may be able to be identified via an established relationship within a social networking service, for example. In another example, the use may be able to enter identifying information of the "friend" for lookup by the service (e.g., the "friend"'s user identification (ID) for the service, name, email address, etc., and may allow the "friend" to verify the relationship. In still another example, the relationship between the user and a "friend" could be established through an automatic close-proximity exchange of information by user devices of the user and the "friend", during which the devices may automatically exchange contact information, establish social networking relationships, etc. Many other ways of identifying and/or verifying a relationship between two users may be contemplated, as would be understood by those skilled in the art.

In an embodiment, a user may be allowed to create multiple user privacy profiles for differing circumstances or situations. For example, a user may wish to maintain certain thresholds when visiting an establishment alone or with another adult, but wish to maintain different thresholds when visiting an establishment with the user's children. In a related example, the user may wish to maintain certain thresholds when visiting a certain type of establishment, but different thresholds when visiting another type of establishment. In yet another example, a user may wish to create one or more specific user privacy profiles for specific establishments. Many other circumstances or situations may also be contemplated where a user may wish to have differing user privacy profiles.

In an embodiment, the determined privacy score(s) and/or privacy-related recommendations may be customized and/or include information regarding the establishment in general (e.g., an overall score or recommendation on a particular retail chain) or at a particular location (e.g., a specific department store at a specific location). This may be important and useful if the privacy practices of an establishment at a particular location fall short, or are better than, a generalized privacy overview of the chain in which it is a part. A generalized overview of a chain, however, may be useful in situations where a user is shopping online, or may be visiting an establishment that is very similar to an establishment, or type of establishment, known by the service, but is not known by the service itself.

In an embodiment, the determined privacy score(s) and/or privacy-related recommendations provided to a user may not only be based on the user's preferences, experiences, and/or behavior, but also those of users that are "like" them. In this way, the service may be adaptive and generates privacy scores and/or recommendations based on crowd sourcing of behavior and consumer values rather than on hard set policies and rules that may be difficult to decipher, maintain, and change.

Figure 4:
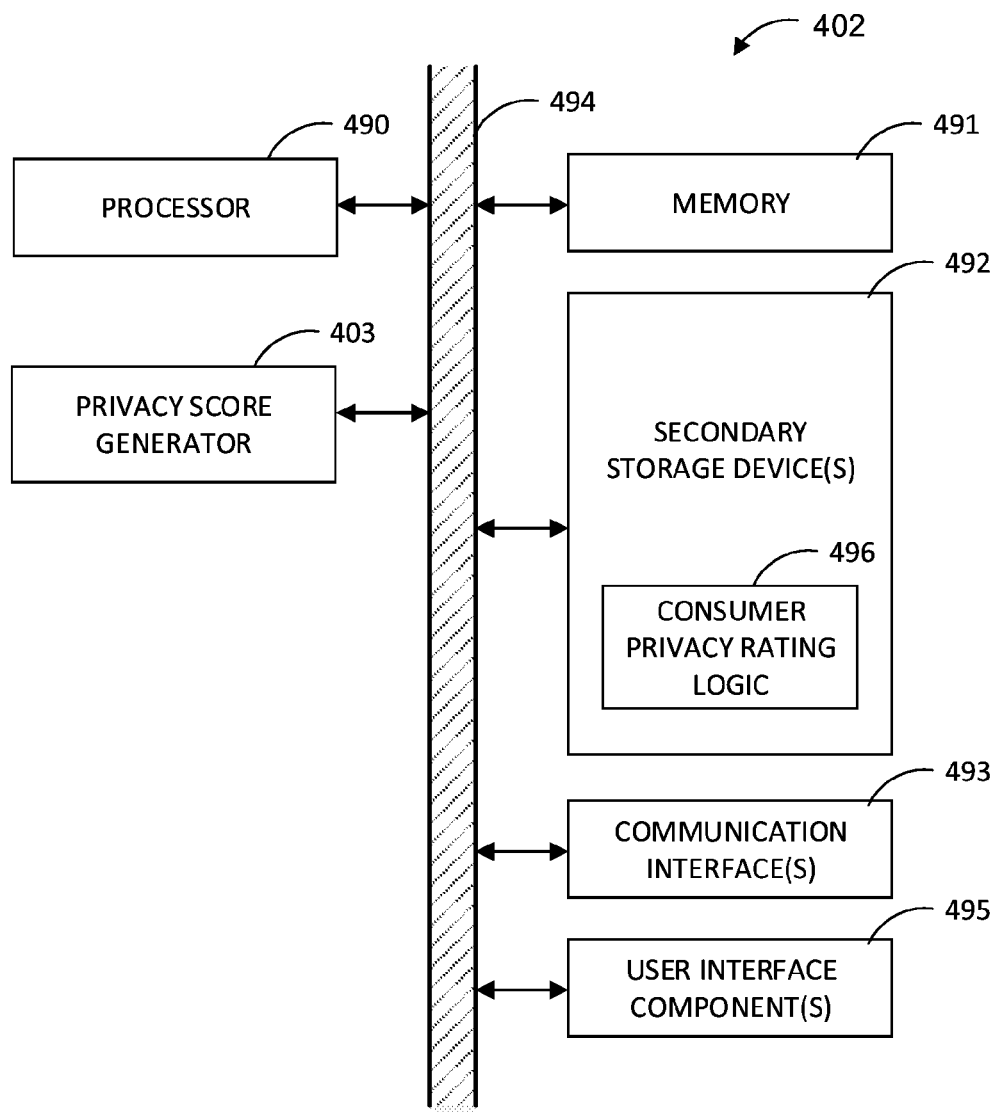
FIG. 4 is a block diagram of an example consumer privacy rating server, according to an embodiment.

FIG. 4 is a block diagram of an example consumer privacy rating server 402, according to an embodiment. The consumer privacy rating server 402 may represent, for example, the consumer privacy rating servers 102, 202, or 302 of FIGS. 1, 2A-2C, and 3A-3C, respectively. As illustrated, consumer privacy rating server 402 may include a processor or controller 490 connected to memory 491, one or more secondary storage devices 492, and a communication interface 493 by a link 494 or similar mechanism. The consumer privacy rating server 402 may optionally include user interface components 495 for use by a system or service administrator, for example, that may include, for example, a touchscreen, a display, one or more user input components (e.g., a keyboard, a mouse, etc.), a speaker, or the like, or any combination thereof. Note, however, that while not shown, consumer privacy rating server 402 may include additional components. In an embodiment, consumer privacy rating server 402 may include a privacy score generator 403 to provide one or more of the functions described herein. Privacy score generator 403 may be separate from processor 490 (as shown in FIG. 4), or may be a part of processor 490. Processor 490 and/or privacy score generator 403 may be a microprocessor, digital ASIC, FPGA, or similar hardware device. In an embodiment, the processor 490 and/or privacy score generator 403 may be a microprocessor, and software may be stored or loaded into the memory 491 for execution by the processor 490 and/or privacy score generator 403 to provide the functions described herein. The one or more secondary storage devices 492 may be, for example, one or more hard drives or the like, and may store logic 496 to be executed by the processor 490 and/or privacy score generator 403. The communication interface 493 may be implemented in hardware or a combination of hardware and software. The communication interface 493 may provide a wired or wireless network interface to a network, such as the network 112 shown in FIG. 1.

Figure 5:
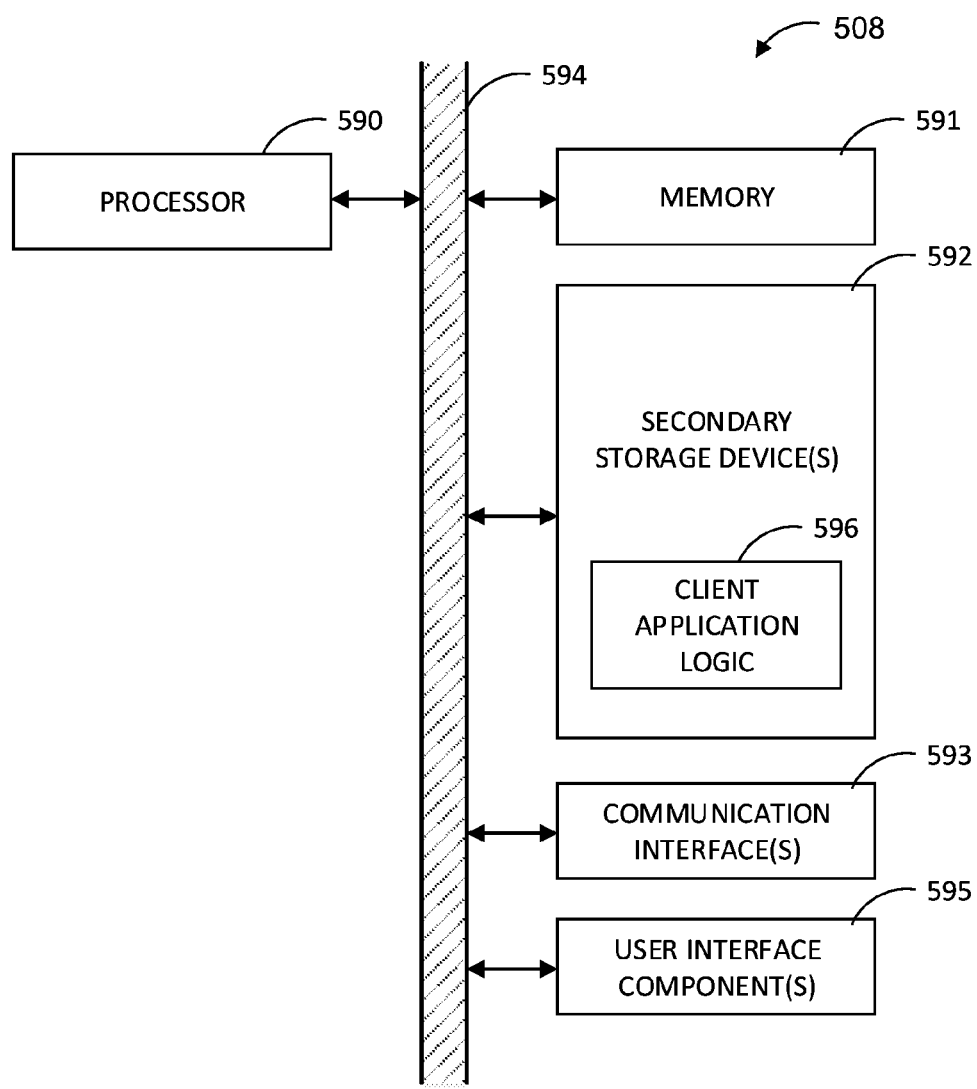
FIG. 5 is a block diagram of an example user device, according to an embodiment.

FIG. 5 is a block diagram of an example user device 508, according to an embodiment. The user device 508 may represent, for example, the user devices 108, 208, or 308 of FIGS. 1, 2A-2C, and 3A-3C, respectively. As illustrated, user device 508 may include a processor or controller 590 connected to memory 591, one or more secondary storage devices 592, and a communication interface 593 by a link 594 or similar mechanism. The user device 508 may also include user interface components 595 for use by a user of the user device (e.g., a consumer), that may include, for example, a touchscreen, a display, one or more user input components (e.g., a keyboard, a mouse, etc.), a speaker, or the like, or any combination thereof. Note, however, that while not shown, user device 508 may include additional components. The processor 590 may be a microprocessor, digital ASIC, FPGA, or similar hardware device. In an embodiment, the processor 590 may be a microprocessor, and software may be stored or loaded into the memory 591 for execution by the processor 590 to provide the functions described herein. The one or more secondary storage devices 592 may be, for example, one or more hard drives or the like, and may store logic 596 to be executed by the processor 590.

The communication interface 593 may be implemented in hardware or a combination of hardware and software. The communication interface 593 may provide a wired or wireless network interface to a network, such as the network 112 shown in FIG. 1.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

As discussed above, one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, or other data storage device.

Technologies disclosed herein determine privacy metrics that use publicly available information and crowd-sourced data in conjunction with a user's own context and previous behavior to provide ratings and/or recommendations to the user with regard to what action to take at the establishments the user would like to patronize based on the user's own comfort level with regard to privacy. The particular examples and scenarios used in this document are for ease of understanding and are not to be limiting. The technologies described herein may be used in many other contexts and situations that may or may not involve business establishments or even address privacy concerns directly. For example, the technologies described herein may be used to provide safety metrics rather than, or in addition to, privacy metrics (e.g., to warn that there is insufficient lighting in certain areas of an establishment or parking lot of an establishment, or to warn that a particular employee or manager of an establishment is difficult to deal with or may cause a person to feel uncomfortable). As another example, the technologies described herein may address privacy (or safety) concerns of a location other than a retail establishment as used in examples herein, such as a public park, a playground, a school or university, an amusement park, or an entertainment venue. In yet another example, a user using an email client or another application where the user may be about to share information with an establishment (and/or possibly with a third party establishment handling the transmission of the information, such as an email service) may wish to know how the establishment(s) handle private information (social security numbers, email addresses, physical addresses, phone numbers, etc.). A service such as that described herein may provide a dynamic rating and/or recommendation for these establishment(s) prior to the user providing such personal information. Based on the rating, the user may be able to determine whether to share certain pieces of personal information using that particular application. Many other uses and/or types of establishments may also be contemplated.

An advantage of using the technologies described herein is that much of the data incorporated into the ratings and recommendations is data that is not subjective, but instead based on actual behavior by consumers, which may be collected automatically by the consumer privacy rating service. In this way, privacy ratings and recommendations are not based solely on entered input, which may be biased and/or not necessarily indicative of the whole truth, and the near real-time automated collection of consumer behavior makes the system dynamic in nature. Another advantage of the technologies described herein is that the ratings and/or recommendations take a user's own privacy thresholds into account. In other words, the ratings and/or recommendations are customized for each user. For the same establishment, the ratings and/or recommendations for two different users may be determined to be quite different depending on the known preferences of the two users. Many other advantages may also be contemplated.

As used in this application and in the claims, a list of items joined by the term "one or more of" can mean any combination of the listed terms. For example, the phrases "one or more of A, B or C" and "one or more of A, B, and C" can mean A; B; C; A and B; A and C; B and C; or A, B and C.

The following examples pertain to further embodiments.

Example 1 may include a system for rating privacy of an establishment, comprising: one or more storage devices to store one or more of privacy-related information regarding one or more establishments or user-related data; and a privacy score generator to: receive a location designation of a user device from the user device; obtain privacy-related information regarding one or more establishments that are in proximity of the location designation from the one or more storage devices; and generate one or more privacy score vector algorithms for the one or more establishments based on the privacy-related information regarding the one or more establishments.

Example 2 may include the subject matter of Example 1, wherein the privacy score generator is further to provide the one or more privacy score vector algorithms to the user device.

Example 3 may include the subject matter of Example 1, wherein the privacy score generator is further to: obtain the privacy profile of the user from the one or more storage devices or the user device; determine one or more privacy scores for the one or more establishments by applying the privacy profile of the user to the one or more privacy score vector algorithms; and provide the one or more privacy scores to the user device.

Example 4 may include the subject matter of Example 3, wherein the privacy score generator is further to: receive a request from the user device for details regarding a particular privacy score of the one or more privacy scores; and provide the details regarding the particular privacy score to the user device.

Example 5 may include the subject matter of Example 3 or Example 4, wherein the privacy profile of the user includes one or more of: user-provided preferences regarding privacy, user-provided information regarding the user's experience with various establishments or other establishments similar to the various establishments, or automatically obtained information regarding the user's behavior with regard to the various establishments or other establishments similar to the various establishments.

Example 6 may include the subject matter of Example 5, wherein the user-provided information includes one or more of: the types of establishments that the user frequents, the types of transactions the user conducts at the types of establishments, or information regarding the user's privacy-related experiences at various establishments.

Example 7 may include the subject matter of Example 5 or Example 6, wherein the user-provided preferences include one or more of: the user's comfort level with cameras or other surveillance devices used at establishments; the user's comfort level with one or more of facial analysis, gender recognition, gender profiling, age recognition, age profiling, or dress profiling; the user's comfort level with providing to establishments one or more of the user's name, the user's birthdate, the user's phone number, the user's email address, the user's zip code, the user's gender, the names of the user's children, or the ages of the user's children, or the user's comfort level with allowing establishments to keep track of the user's transactions.

Example 8 may include the subject matter of any one of Examples 3-7, wherein the privacy score generator is further to: generate a privacy-related recommendation regarding a particular establishment based on the privacy-related information and the privacy profile of the user; and provide the privacy-related recommendation to the user device.

Example 9 may include the subject matter of Example 8, wherein the privacy-related recommendation includes one or more of: a recommendation to enter the establishment without a privacy concern, a recommendation to not enter the establishment, a recommendation to enter the establishment but not use a loyalty card of the establishment, a recommendation to enter the establishment but use the loyalty card only for specific purchases, a recommendation to enter the establishment but not provide one or more items of personal information, a recommendation to enter the establishment but to avoid specific areas of the establishment, or a recommendation to enter the establishment but to avoid certain employees of the establishment.

Example 10 may include the subject matter of Example 8 or Example 9, wherein the privacy score generator is further to: obtain outcome information regarding the user's behavior regarding the establishment after receiving the privacy-related recommendation, wherein the outcome information is based on one or more of information automatically derived from the user's actions with regard to the establishment or manually-provided information from the user regarding the user's actions with regard to the establishment; and update the privacy-related information regarding the establishment based on the outcome information.

Example 11 may include the subject matter of Example 10, wherein the privacy score generator is further to update the privacy profile of the user based on the outcome information.

Example 12 may include the subject matter of any one of Examples 3-11, wherein the privacy profile of the user includes one or more differing privacy profiles each relevant to different circumstances.

Example 13 may include the subject matter of any one of Examples 3-12, wherein the privacy profile of the user is to mirror a privacy profile of another user who has an established relationship with the user.

Example 14 may include the subject matter of any one of Examples 3-13, wherein the privacy score comprises at least one of: a numerical rating; a grade; an indication of high, medium, or low; or an object rating.

Example 15 may include the subject matter of any one of Examples 1-14, wherein the privacy score generator is further to: collect at least a portion of the privacy-related information from electronically accessible data sources.

Example 16 may include the subject matter of Example 15, wherein the data sources include data sources of one or more of advocacy groups, watchdogs, privacy-related blogs, news services, or the one or more establishments.

Example 17 may include the subject matter of Example 15 or Example 16, wherein data collected from the data sources includes one or more of electronically accessible privacy statements of establishments, pledges to consumers by establishments, data policies of the establishments, warnings regarding establishments, news stories regarding establishments.

Example 18 may include the subject matter of any one of Examples 1-17, wherein the privacy-related information regarding the one or more establishments includes one or more of submissions of one or more users, wherein the one or more submissions include one or more of photographs, videos, positive feedback, negative feedback, or general comments of the one or more users regarding the one or more establishments.

Example 19 may include the subject matter of any one of Examples 1-18, wherein the privacy-related information regarding the one or more establishments includes automatically obtained data regarding behavior of one or more users with regard to the one or more establishments.

Example 20 may include the subject matter of any one of Examples 1-19, wherein each establishment of the one or more establishments includes one of: a retail store, a restaurant, a website of a retail store, a mobile application of a retail store, a website of a restaurant, or a mobile application of a restaurant.

Example 21 may include the subject matter of any one of Examples 1-20, wherein being in the proximity of a particular establishment includes at least one of: within a given distance of known coordinates of the establishment, inside the establishment, at a website of the establishment, or within a user-entered zip code that includes the establishment.

Example 22 may include the subject matter of any one of Examples 1-21, wherein the location designation includes one or more of: global positioning system (GPS) coordinates, one or more zip codes, one or more establishment names, or one or more establishment types.

Example 23 may include at least one computer-readable storage medium encoded with a computer program including instructions that when executed on a processor, cause the processor to: receive a location designation of a user device from the user device; obtain privacy-related information regarding one or more establishments in proximity of the location designation from one or more electronically accessible storage devices; and generate one or more privacy score vector algorithms for the one or more establishments based on the privacy-related information regarding the one or more establishments.

Example 24 may include the subject matter of Example 23, wherein the computer program includes instructions to further cause the processor to provide the one or more privacy score vector algorithms to the user device.

Example 25 may include the subject matter of Example 23, wherein the computer program includes instructions to further cause the processor to: obtain the privacy profile of the user from the one or more electronically accessible storage devices or the user device; determine one or more privacy scores for the one or more establishments by applying the privacy profile of the user to the one or more privacy score vector algorithms; and provide the one or more privacy scores to the user device.

Example 26 may include the subject matter of Example 25, wherein the computer program includes instructions to further cause the processor to: generate a privacy-related recommendation regarding a particular establishment based on the privacy-related information and the privacy profile of the user; and provide the privacy-related recommendation to the user device.

Example 27 may include an apparatus for rating privacy of an establishment, comprising: means for receiving a location designation of a user device from the user device; means for obtaining privacy-related information regarding one or more establishments in proximity of the location designation from one or more electronically accessible storage devices; and means for generating one or more privacy score vector algorithms for the one or more establishments based on the privacy-related information regarding the one or more establishments.

In Example 28, Example 27 may optionally include means for providing the one or more privacy score vector algorithms to the user device.

In Example 29, Example 27 may optionally include means for obtaining the privacy profile of the user from the one or more electronically accessible storage devices or the user device; means for determining one or more privacy scores for the one or more establishments by applying the privacy profile of the user to the one or more privacy score vector algorithms; and means for providing the one or more privacy scores to the user device.

In Example 30, Example 29 may optionally include means for generating a privacy-related recommendation regarding a particular establishment based on the privacy-related information and the privacy profile of the user; and means for providing the privacy-related recommendation to the user device.

Example 31 may include a machine-implemented method of rating privacy of one or more establishments, comprising: receiving a location designation of a user device from the user device; obtaining privacy-related information regarding one or more establishments in proximity of the location designation from one or more electronically accessible storage devices; and generating one or more privacy score vector algorithms for the one or more establishments based on the privacy-related information regarding the one or more establishments.

In Example 32, Example 31 may optionally include providing the one or more privacy score vector algorithms to the user device.

In Example 33, Example 31 may optionally include: obtaining the privacy profile of the user from the one or more electronically accessible storage devices or the user device; determining one or more privacy scores for the one or more establishments by applying the privacy profile of the user to the one or more privacy score vector algorithms; and providing the one or more privacy scores to the user device.

In Example 34, Example 33 may optionally include generating a privacy-related recommendation regarding a particular establishment based on the privacy-related information and the privacy profile of the user; and providing the privacy-related recommendation to the user device.

Example 35 may include at least one machine readable storage medium comprising a plurality of instructions that in response to being executed on a computing device, cause the computing device to carry out a method according to any one of Examples 31-34.

Example 36 may include an apparatus configured to perform the method of any one of the Examples 31-34.

Example 37 may include a computer system to perform the method of any one of Examples 31-34.

Example 38 may include a machine to perform the method of any one of Examples 31-34.

Example 39 may include an apparatus comprising means for performing the method of any one of Examples 31-34.

Example 40 may include a computing device comprising memory and a chipset configured to perform the method of any one of Examples 31-34.

Example 41 may include a user device for rating privacy of an establishment, comprising: a processor and memory; a user interface; and a communication system configured to interface with a communication network and one or more of the processor or the user interface, wherein the processor is to: provide a location designation to a consumer privacy rating server; and obtain one or more privacy scores for one or more respective establishments, wherein a location identified by the location designation is in proximity of the one or more establishments, and wherein the privacy scores are based on privacy-related information regarding the one or more establishments and a privacy profile of a user of the user device.

Example 42 may include the subject matter of Example 41, wherein the obtaining the one or more privacy scores comprises receiving the one or more privacy scores from the consumer privacy rating server; and wherein the processor is further to display the one or more privacy scores.

Example 43 may include the subject matter of Example 42, wherein the processor is further to: receive, from the consumer privacy rating server, a privacy-related recommendation regarding a particular establishment based on the privacy-related information and the privacy profile of the user; and display the privacy-related recommendation.

Example 44 may include the subject matter of Example 41, wherein the obtaining the one or more privacy scores comprises: receiving, from the consumer privacy rating server, one or more vector algorithms for determining the one or more privacy scores, wherein the privacy-related information regarding the one or more establishments is incorporated into the one or more vector algorithms; and determining the one or more privacy scores by applying the privacy profile of the user to the one or more vector algorithms; and wherein the processor is further to display the one or more privacy scores.

Example 45 may include the subject matter of Example 44, wherein the processor is further to: generate a privacy-related recommendation regarding a particular establishment based on the privacy-related information and the privacy profile of the user; and display the privacy-related recommendation.

Example 46 may include at least one computer-readable storage medium encoded with a computer program including instructions that when executed on a processor, cause the processor to: provide a location designation of a user device to a consumer privacy rating server; and obtain one or more privacy scores for one or more respective establishments, wherein a location identified by the location designation is in proximity of the one or more establishments, and wherein the privacy scores are based on privacy-related information regarding the one or more establishments and a privacy profile of a user of the user device.

Example 47 may include the subject matter of Example 46, wherein the obtaining the one or more privacy scores comprises receiving the one or more privacy scores from the consumer privacy rating server; and wherein the computer program includes instructions to further cause the processor to display the one or more privacy scores.

Example 48 may include the subject matter of Example 47, wherein the computer program includes instructions to further cause the processor to: receive, from the consumer privacy rating server, a privacy-related recommendation regarding a particular establishment based on the privacy-related information and the privacy profile of the user; and display the privacy-related recommendation.

Example 49 may include the subject matter of Example 46, wherein the obtaining the one or more privacy scores comprises: receiving, from the consumer privacy rating server, one or more vector algorithms for determining the one or more privacy scores, wherein the privacy-related information regarding the one or more establishments is incorporated into the one or more vector algorithms; and determining the one or more privacy scores by applying the privacy profile of the user to the one or more vector algorithms; and wherein the computer program includes instructions to further cause the processor to display the one or more privacy scores.

Example 50 may include the subject matter of Example 49, wherein the computer program includes instructions to further cause the processor to: generate a privacy-related recommendation regarding a particular establishment based on the privacy-related information and the privacy profile of the user; and display the privacy-related recommendation.

Example 51 may include an apparatus for rating privacy of an establishment, comprising: means for providing a location designation of a user device to a consumer privacy rating server; and means for obtaining one or more privacy scores for one or more respective establishments, wherein a location identified by the location designation is in proximity of the one or more establishments, and wherein the privacy scores are based on privacy-related information regarding the one or more establishments and a privacy profile of a user of the user device.

Example 52 may include the subject matter of Example 51, wherein the means for obtaining the one or more privacy scores comprises means for receiving the one or more privacy scores from the consumer privacy rating server; and wherein the apparatus further comprises means for displaying the one or more privacy scores.

In Example 53, Example 52 may optionally include means for receiving, from the consumer privacy rating server, a privacy-related recommendation regarding a particular establishment based on the privacy-related information and the privacy profile of the user; and means for displaying the privacy-related recommendation.

Example 54 may include the subject matter of Example 51, wherein the means for obtaining the one or more privacy scores comprises: means for receiving, from the consumer privacy rating server, one or more vector algorithms for determining the one or more privacy scores, wherein the privacy-related information regarding the one or more establishments is incorporated into the one or more vector algorithms; and means for determining the one or more privacy scores by applying the privacy profile of the user to the one or more vector algorithms; and wherein the apparatus further comprises means for displaying the one or more privacy scores.

In Example 55, Example 54 may optionally include means for generating a privacy-related recommendation regarding a particular establishment based on the privacy-related information and the privacy profile of the user; and means for displaying the privacy-related recommendation.

Example 56 may include a method for rating privacy of an establishment, comprising: providing a location designation of a user device to a consumer privacy rating server; and obtaining one or more privacy scores for one or more respective establishments, wherein a location identified by the location designation is in proximity of the one or more establishments, and wherein the privacy scores are based on privacy-related information regarding the one or more establishments and a privacy profile of a user of the user device.

Example 57 may include the subject matter of Example 56, wherein the obtaining the one or more privacy scores comprises receiving the one or more privacy scores from the consumer privacy rating server; and wherein the method further comprises displaying the one or more privacy scores.

In Example 58, Example 57 may optionally include receiving, from the consumer privacy rating server, a privacy-related recommendation regarding a particular establishment based on the privacy-related information and the privacy profile of the user; and displaying the privacy-related recommendation.

Example 59 may include the subject matter of Example 56, wherein the obtaining the one or more privacy scores comprises: receiving, from the consumer privacy rating server, one or more vector algorithms for determining the one or more privacy scores, wherein the privacy-related information regarding the one or more establishments is incorporated into the one or more vector algorithms; and determining the one or more privacy scores by applying the privacy profile of the user to the one or more vector algorithms; and wherein the method further comprises displaying the one or more privacy scores.

In Example 60, Example 59 may optionally include generating a privacy-related recommendation regarding a particular establishment based on the privacy-related information and the privacy profile of the user; and displaying the privacy-related recommendation.

Example 61 may include at least one machine readable storage medium comprising a plurality of instructions that in response to being executed on a computing device, cause the computing device to carry out a method according to any one of Examples 56-60.

Example 62 may include an apparatus configured to perform the method of any one of the Examples 56-60.

Example 63 may include a computer system to perform the method of any one of Examples 56-60.

Example 64 may include a machine to perform the method of any one of Examples 56-60.

Example 65 may include an apparatus comprising means for performing the method of any one of Examples 56-60.

Example 66 may include a computing device comprising memory and a chipset configured to perform the method of any one of Examples 56-60.

What is claimed is:

1. An apparatus, comprising a processor and memory configured to:
construct a privacy preference profile of a user based on one or more of privacy preferences of the user, behavior of the user with respect to establishments with which the user interacts, and privacy preferences of other users;
construct a privacy profile of an establishment based on one or more of privacy-related information provided by the establishment, privacy-related information provided by people who have experience with the establishment, and behaviors of people with respect to the establishment;
generate a recommendation for the user regarding interacting with the establishment based on the privacy preference profile of the user and the privacy profile of the establishment; and
provide the recommendation to a device of the user when the device of the user is proximate to the establishment.

2. The apparatus of claim 1, wherein the processor and memory are further configured to:
construct the privacy preference profile of the user based on a preference of the user regarding exposure to one or more of observation cameras, facial analysis, gender recognition, age recognition, gender profiling, age profiling, and dress profiling.

3. The apparatus of claim 1, wherein the processor and memory are further configured to:
infer a privacy preference of the user based on the behavior of the user with respect to establishments with which the user interacts; and
construct the privacy preference profile of the user based at least in part on the inferred privacy preference of the user.

4. The apparatus of claim 1, wherein the processor and memory are further configured to:
modify the privacy preference profile of the user based on behavior of the user with respect to the recommendation.

5. The apparatus of claim 1, wherein the processor and memory are further configured to:
modify the privacy preference profile of the user based on behavior of the user that is contrary to the recommendation.

6. The apparatus of claim 5, wherein the processor and memory are further configured to:
construct the privacy preference profile of the user to include a preference of the user to avoid facilities at which surveillance devices are deployed;
construct the privacy profile of the establishment to include an indication that a surveillance device is deployed at the establishment;
generate the recommendation to include a warning to avoid entering the establishment based on the preference of the user to avoid establishments at which surveillance devices are deployed and the indication that a surveillance device is deployed at the establishment; and
modify the preference of the user to avoid establishments at which surveillance devices are deployed if the user enters the establishment subsequent to the warning.

7. The apparatus of claim 1, wherein the processor and memory are further configured to:
construct the privacy profile of the establishment based on the privacy-related information provided by people who have experience with the establishment;
wherein the privacy-related information provided by people who have experience with the establishment includes one or more of photographs, videos, and comments.

8. The apparatus of claim 1, wherein the processor and memory are further configured to:
construct the privacy profile of the establishment based on the behaviors of people with respect to the establishment.

9. The apparatus of claim 8, wherein the processor and memory are further configured to:
infer that a person is satisfied with privacy afforded to children at the establishment if the person brings children to the establishment; and
construct the privacy profile of the establishment based in part on the inference that the person is satisfied with privacy afforded to children at the establishment.

10. The apparatus of claim 8, wherein the processor and memory are further configured to:
infer that a person trusts the establishment based on an extent to which the person uses one or more of a loyalty card of the establishment and a financial transaction card of the establishment; and
construct the privacy profile of the establishment based in part on the inference that the person trusts the establishment.

11. The apparatus of claim 8, wherein the processor and memory are further configured to:
monitor audio of a person at the establishment to determine if the person verbally discloses personal information;
infer that the person trusts the establishment if the person is determined to have disclosed personal information at the establishments; and
construct the privacy profile of the establishment based in part on the inference that the person trusts the establishment.

12. The apparatus of claim 8, wherein the processor and memory are further configured to:
monitor electronic communications of a person who has experience with the establishment;
infer that the person has not shared personal information with the establishment if the person does not receive an electronic communication from the establishment; and
construct the privacy profile of the establishment based in part on the inference that the person has not shared personal information with the establishment.

13. The apparatus of claim 1, wherein the processor and memory are further configured to construct the privacy profile of the establishment based on one or more of:
an extent of to which the establishment deploys observation cameras at the establishment;
an extent to which the establishment profiles customers based on demographics of the customers;
an extent to which the establishment profiles customers based on customer usage of a loyalty program of the establishment;
an extent to which the establishment profiles customers based on customer usage of a financial transaction card associated with the establishment;
an extent to which the establishment discloses customer information to one or more other establishments;
an extent to which the establishment anonymizes the customer information disclosed to one or more other establishments;
a privacy statement of the establishment; and
a data retention policy of the establishment.

14. A non-transitory computer readable medium encoded with a computer program that includes instructions to cause a processor to:
construct a privacy preference profile of a user based on one or more of privacy preferences of the user, behavior of the user with respect to establishments with which the user interacts, and privacy preferences of other users;
construct a privacy profile of an establishment based on one or more of privacy-related information provided by the establishment, privacy-related information provided by people who have experience with the establishment, and behaviors of people with respect to the establishment;

generate a recommendation for the user regarding interacting with the establishment based on the privacy preference profile of the user and the privacy profile of the establishment; and provide the recommendation to a device of the user when the device of the user is proximate to the establishment.

15. The non-transitory computer readable medium of claim 14, further including instructions to cause the processor to:
construct the privacy preference profile of the user based on a preference of the user regarding exposure to one or more of observation cameras, facial analysis, gender recognition, age recognition, gender profiling, age profiling, and dress profiling.

16. The non-transitory computer readable medium of claim 14, further including instructions to cause the processor to:
infer a privacy preference of the user based on the behavior of the user with respect to establishments with which the user interacts; and
construct the privacy preference profile of the user based at least in part on the inferred privacy preference of the user.

17. The non-transitory computer readable medium of claim 14, further including instructions to cause the processor to:
modify the privacy preference profile of the user based on behavior of the user that is contrary to the recommendation.

18. The non-transitory computer readable medium of claim 14, further including instructions to cause the processor to:
construct the privacy profile of the establishment based on the privacy-related information provided by people who have experience with the establishment;
wherein the privacy-related information provided by people who have experience with the establishment includes one or more of photographs, videos, and comments.

19. The non-transitory computer readable medium of claim 14, further including instructions to cause the processor to:
construct the privacy profile of the establishment based on the behaviors of people with respect to the establishment.

20. A machine-implemented method, comprising:
constructing a privacy preference profile of a user based on one or more of privacy preference input of the user, behavior of the user with respect to establishments with which the user interacts, and privacy preferences of other users;
constructing a privacy profile of an establishment based on one or more of privacy-related information provided by the establishment, privacy-related information provided by people who have experience with the establishment, and behaviors of people with respect to the establishment;
generating a recommendation for the user regarding interacting with the establishment based on the privacy preference profile of the user and the privacy profile of the establishment; and
presenting the recommendation at a device of the user.

21. The machine-implemented method of claim 20, wherein the constructing a privacy preference profile of a user includes:
constructing the privacy preference profile of the user based on a preference of the user regarding exposure to one or more of observation cameras, facial analysis, gender recognition, age recognition, gender profiling, age profiling, and dress profiling.

22. The machine-implemented method of claim 20, wherein the constructing a privacy preference profile of a user includes:
inferring a privacy preference of the user based on the behavior of the user with respect to establishments with which the user interacts; and
constructing the privacy preference profile of the user based at least in part on the inferred privacy preference of the user.

23. The machine-implemented method of claim 20, further including:
modifying the privacy preference profile of the user based on behavior of the user that is contrary to the recommendation.

24. The machine-implemented method of claim 20, wherein the constructing a privacy profile of an establishment includes:
constructing the privacy profile of the establishment based on the privacy-related information provided by people who have experience with the establishment;
wherein the privacy-related information provided by people who have experience with the establishment includes one or more of photographs, videos, and comments.

25. The machine-implemented method of claim 20, wherein the constructing a privacy profile of an establishment includes:
constructing the privacy profile of the establishment based on the behaviors of people with respect to the establishment.

* * * * *